(12) United States Patent
Inugai et al.

(10) Patent No.: US 7,967,931 B2
(45) Date of Patent: Jun. 28, 2011

(54) SINGLE-REEL TYPE TAPE CARTRIDGE

(75) Inventors: Yasuo Inugai, Osaka-fu (JP); Takuya Katayama, Osaka-fu (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 0 days.

(21) Appl. No.: 12/613,230

(22) Filed: Nov. 5, 2009

(65) Prior Publication Data

US 2010/0050413 A1 Mar. 4, 2010

Related U.S. Application Data

(63) Continuation of application No. 10/984,899, filed on Nov. 10, 2004, now abandoned.

(30) Foreign Application Priority Data

Nov. 13, 2003 (JP) ................................. 2003-383497

(51) Int. Cl.
*B32B 37/00* (2006.01)
(52) U.S. Cl. ................................. 156/73.1; 156/580.2
(58) Field of Classification Search ................. 156/73.1, 156/290, 292, 308.2, 308.4, 309.6, 580.1, 156/580.2; 264/442–445
See application file for complete search history.

(56) References Cited

U.S. PATENT DOCUMENTS

| 3,867,232 | A | 2/1975 | Thompson et al. |
|---|---|---|---|
| 6,482,291 | B1 | 11/2002 | Kume et al. |
| 6,502,776 | B2 | 1/2003 | Sogabe et al. |
| 6,655,623 | B2 | 12/2003 | Kaneda et al. |
| 2002/0017581 | A1* | 2/2002 | Sogabe et al. ............ 242/332.4 |
| 2002/0162911 | A1 | 11/2002 | Kaneda et al. |

FOREIGN PATENT DOCUMENTS

| EP | 1253591 A2 | 10/2002 |
|---|---|---|
| JP | 2001-357658 A | 12/2001 |
| JP | 2002-324377 A | 11/2002 |

* cited by examiner

*Primary Examiner* — James Sells
(74) *Attorney, Agent, or Firm* — Birch, Stewart, Kolasch & Birch, LLP

(57) ABSTRACT

In a single-reel type tape cartridge, a coupling portion of a leader tape includes a pair of winding pieces disposed at opposite sides of a cutout and each winding piece includes a base portion and a turnover portion wound around a pin of a leader member so as to be ultrasonically welded to the base portion. An anvil for supporting the coupling portion of the leader tape has a pair of anvil faces each having a width smaller than that of the turnover portion and ultrasonic welding of the turnover portion to the base portion is performed by supporting the coupling portion on the anvil faces. The turnover portion is divided into a completely welded area having a width substantially equal to that of each of the anvil faces and an incompletely welded area disposed outside each of opposite side edges of the completely welded area.

4 Claims, 5 Drawing Sheets

SINGLE-REEL TYPE TAPE CARTRIDGE

CROSS-REFERENCE

This application is a Continuation of U.S. application Ser. No. 10/984,899 (now abandoned), filed on Nov. 10, 2004, which claims priority to Japanese Application 2003-383497 filed on Nov. 13, 2003. The entire contents of the above applications are hereby incorporated by reference.

BACKGROUND OF THE INVENTION

1. Field of the Invention

The present invention relates to a single-reel type tape cartridge in which a leader member is coupled with a leading edge of a tape. The leader member is provided for drawing out the tape to a tape drive mechanism and is coupled with a leader tape joined to a leading edge of a magnetic tape.

2. Description of the Prior Art

In order to couple the leader member with the leader tape, it is known from, for example, Japanese Patent Laid-Open Publication No. 2002-324377 that a cutout is formed at a widthwise central location of a coupling portion of the leader tape so as to define a pair of winding pieces at opposite sides of the cutout in the coupling portion and the winding pieces are wound around a pin of the leader member and turned over to the leader tape so as to be attached to the leader tape by ultrasonic welding. By rounding lateral side edges of a welding horn depressed against the winding pieces, one lateral edge of each winding piece adjacent to its distal edge and the other lateral edge of each winding piece adjacent to the pin of the leader member are subjected to welding to a more scatterable degree than other weld zones so as to prevent concentration of loads on the welded lateral edges of each winding piece such that the leader tape is prevented from being fractured at the welded lateral edges of each winding piece.

Meanwhile, fused resin may ooze out of peripheral edges of the welded winding pieces so as to be solidified. In order to prevent dropout due to drop of the solidified resin in the tape drive mechanism, it is known from, for example, Japanese Patent Laid-Open Publication No. 2001-357658 that an external shape of a welded portion is made slightly smaller than a shape of the peripheral edge of each winding piece so as to form an unwelded portion along the peripheral edge of each winding piece. A width of the unwelded portion is set at not less than 0.1 mm.

In the coupling construction of the leader member in the first prior art document referred to above, since the one lateral edge of each winding piece adjacent to its distal edge and the other lateral edge of each winding piece adjacent to the pin of the leader member are subjected to welding to a more scatterable degree than other weld zones, loads concentrated on the welded lateral edges can be scattered widely. However, from a microscopic viewpoint, as welding is performed more scatteredly, load is more likely to be concentrated on welded spots, so that the welded spots readily undergo separation and breakage and thus, it is impossible to avoid gradual drop of welding strength of the welded spots. Since a droplike space for winding the winding pieces around the pin increases by an amount of separation of the welded spots, the pin becomes loose in the coupling portion of the leader tape disadvantageously.

Meanwhile, in the coupling construction of the leader member in the second prior art document referred to above, since the unwelded portion is formed along the peripheral edge of each winding piece, ooze of the fused resin can be prevented. However, since the width of the unwelded portion is small, it is necessary to accurately position a press face of the welding horn relative to the winding pieces and thus, thereby resulting in such an inconvenience as time-consuming and troublesome welding operation.

SUMMARY OF THE INVENTION

Accordingly, an essential object of the present invention is to provide a single-reel type tape cartridge in which since a winding piece of a leader tape is wound around a pin of a leader member so as to be welded to the leader tape securely at a high welding strength by positively preventing ooze of fused resin out of a peripheral edge of the welded winding piece, reliability of a coupling section between the leader tape and the leader member can be upgraded.

Another important object of the present invention is to provide a single-reel type tape cartridge in which by restraining deterioration of material of opposite side edges of the winding piece and the leader tape attached to each other upon thermal welding of the winding piece, fracture of the leader tape from a welded edge of the winding piece can be prevented positively.

In order to accomplish these objects of the present invention, a single-reel type tape cartridge according to the present invention includes a leader tape having a coupling portion disposed at its leading edge, a leader member having a pin and an anvil for supporting the coupling portion of the leader tape. The coupling portion is wound around the pin and turned over to the leader tape so as to be attached to the leader tape by ultrasonic welding and includes a pair of winding pieces spaced away from each other by an elongated cutout formed at a central portion of an end of the leader tape. Each of the winding pieces includes a base portion disposed at its base end portion and a turnover portion wound around the pin and turned over to the base portion so as to be attached to the base portion by ultrasonic welding. The anvil has a pair of anvil faces each having a width smaller than that of the turnover portion and ultrasonic welding of the turnover portion to the base portion is performed by supporting the coupling portion on the anvil faces. A completely welded area having a width substantially equal to that of each of the anvil faces is formed from a center to a vicinity of opposite side edges of the turnover portion and an incompletely welded area is formed between each of opposite side edges of the completely welded area and each of the opposite side edges of the turnover portion.

BRIEF DESCRIPTION OF THE DRAWINGS

These objects and features of the present invention will become apparent from the following description taken in conjunction with the preferred embodiments thereof with reference to the accompanying drawings in which.

Before the description of the present invention proceeds, it is to be noted that like parts are designated by like reference numerals throughout several views of the accompanying drawings.

DETAILED DESCRIPTION OF THE INVENTION

Hereinafter, embodiments of the present invention are described with reference to the drawings.

First Embodiment

Figure 1:
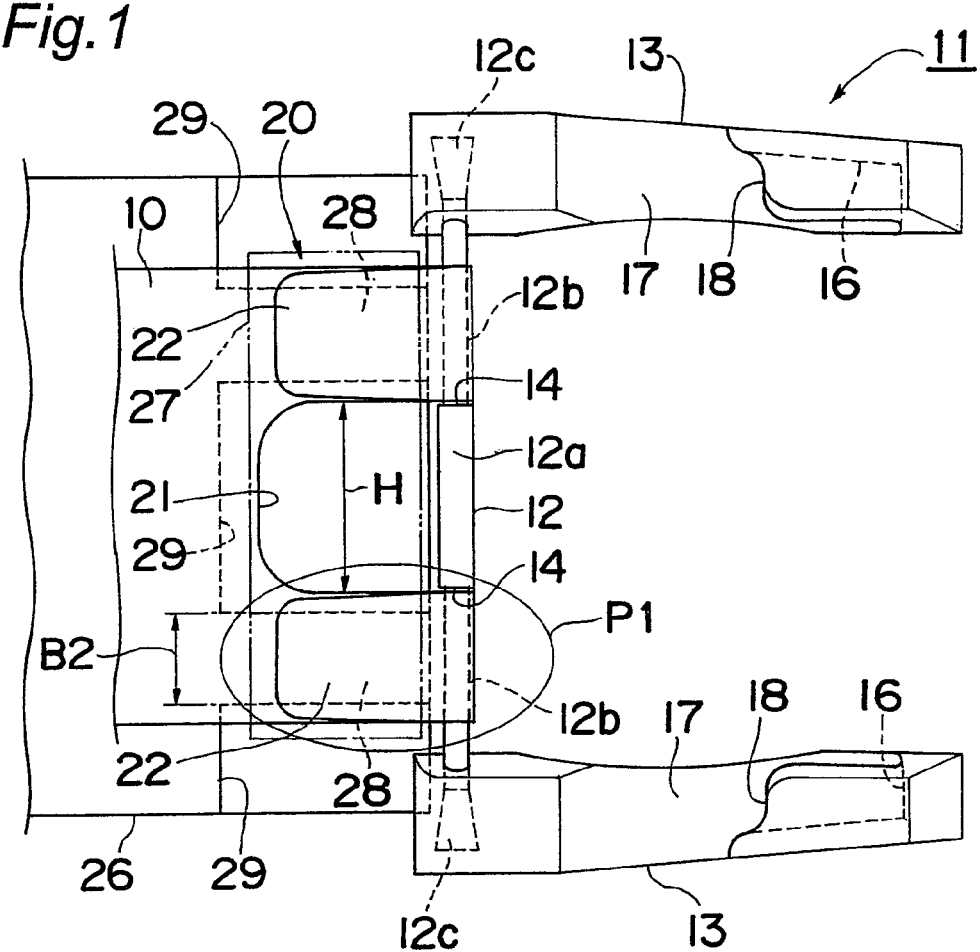
FIG. 1 is a top plan view showing a configuration in which a coupling portion of a leader tape is welded to the leader tape via a pin of a leader member in a single-reel type tape cartridge according to a first embodiment of the present invention.
Figure 2:
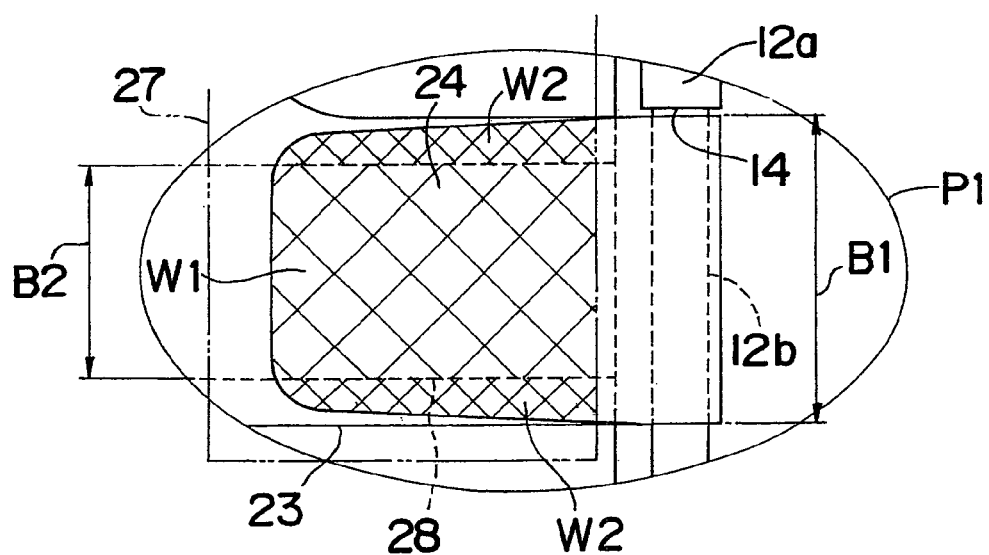
FIG. 2 is an enlarged view of a portion P1 in FIG. 1.
Figure 3:
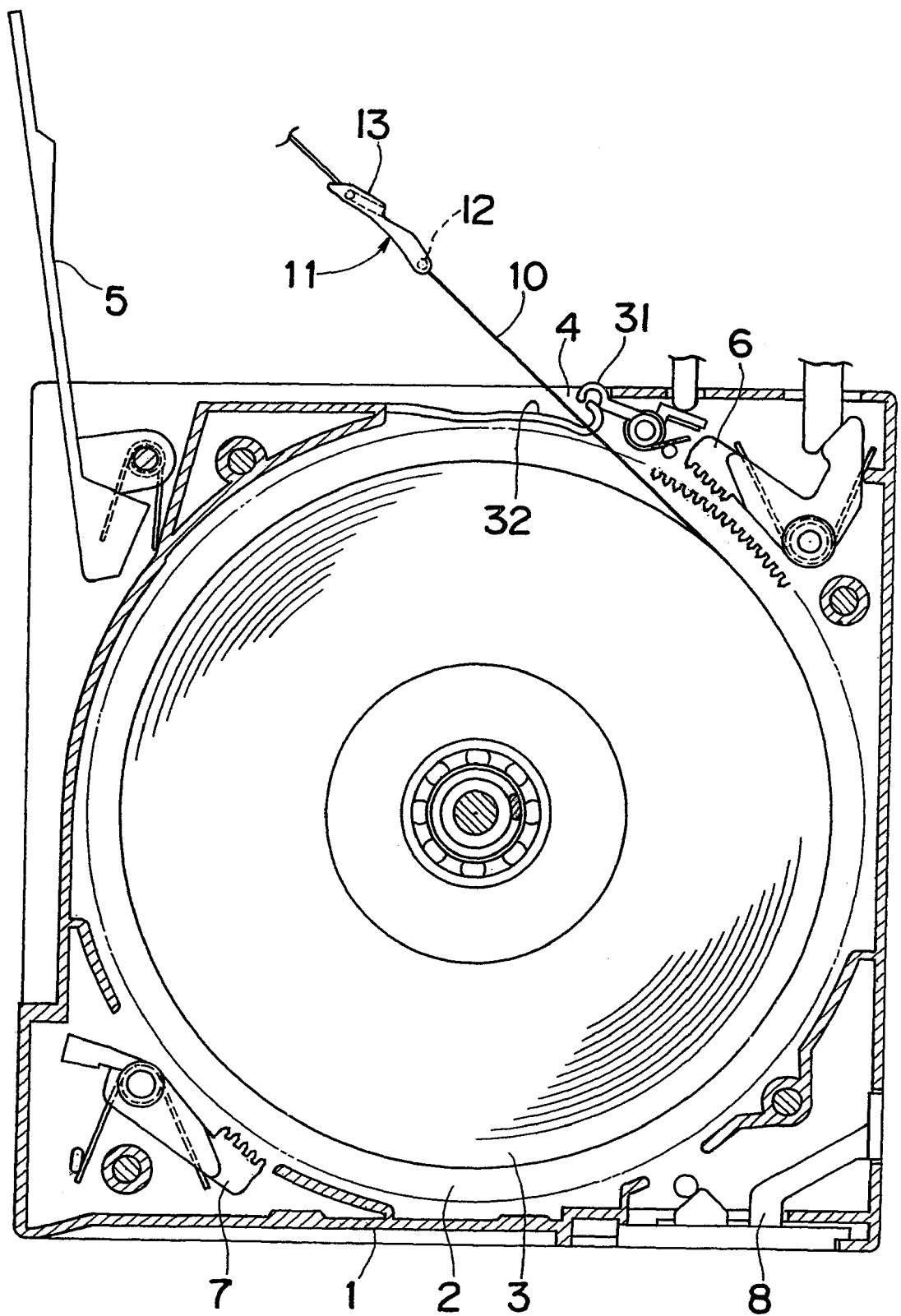
FIG. 3 is a top plan view showing an internal structure of the single-reel type tape cartridge of FIG. 1.
Figure 4:
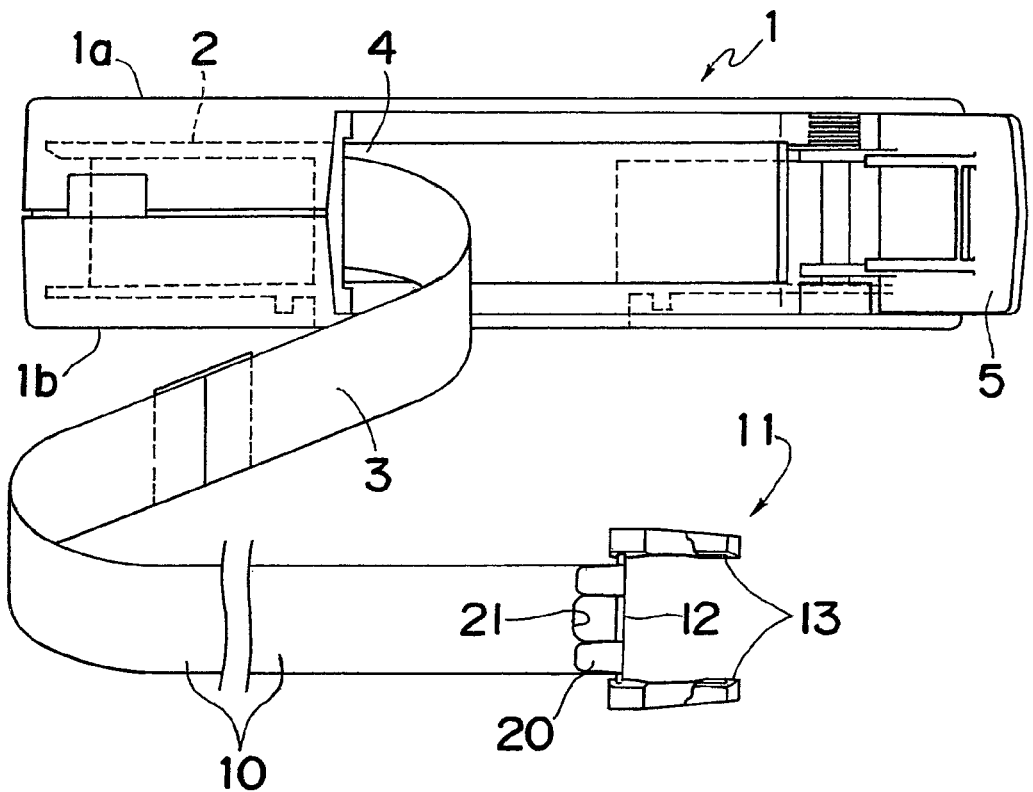
FIG. 4 is a front elevational view showing an operational state of the single-reel type tape cartridge of FIG. 1, in which the leader member is drawn out of a cartridge casing.

FIGS. 1 to 8 show a single-reel type tape cartridge according to a first embodiment of the present invention. In FIGS. 3 and 4, the single-reel type tape cartridge includes a rectangular boxlike casing 1 formed by upper and lower casings 1a and 1b which confront each other so as to be bonded to each other. A tape 3 for recording magnetic signals thereon is wound into a single reel 2 disposed inside the cartridge casing 1. A tape window 4 opens on a front wall of the cartridge casing 1 and is selectively opened and closed by a pivotally movable door 5. The door 5 is normally urged towards a closed position of the tape window 4 by a spring and is locked at the closed position by a locking mechanism (not shown). Reel locking pawls 6 and 7 are, respectively, provided at two opposed inner corners of the cartridge casing 1 and are brought into engagement with gear teeth formed on an outer circumference of the reel 2 so as to hold the reel 2 immovably. A switching piece 8 for preventing erroneous erasure is provided on an inner face of a rear wall of the cartridge casing 1.

In order to enable a catch member of a tape drive mechanism to automatically catch the tape 3 wound into the reel 2, a leader tape 10 is attached to a leading edge of the tape 3 and a leader member 11 is coupled with an end portion of the leader tape 10. The leader member 11 is formed into a substantially U-shaped frame including a pin 12 made of stainless steel and a pair of engagement arms 13 provided at opposite ends of the pin 12, respectively.

As shown in FIGS. 1 and 2, the pin 12 is formed by a thin round rod and has a locking rod 12a disposed at its central portion and a pair of winding rods 12b disposed at opposite sides of the locking rod 12a, respectively. Each of the winding rods 12b is slightly smaller in diameter than the locking rod 12a and an anchor portion 12c is formed at a distal end of each of the winding rods 12b. A pair of step portions 14 for positioning the leader tape 10 are, respectively, formed at opposite ends of the locking rod 12a due to a difference in diameter between the locking rod 12a and the winding rods 12b and a half of the difference is set at not less than a half of a thickness of the leader tape 10. The anchor portion 12c is tapered towards the locking rod 12a and is attached to the engagement arm 13 through insertion so as to prevent separation of the engagement arm 13 and the pin 12 from each other such that the engagement arm 13 and the pin 12 are prevented from being rotated relative to each other.

The engagement arm 13 is formed by an elongated plastic molded item curved convexly towards exterior of the cartridge casing 1 and has an engagement slot 16 formed on its inner side face and a guide face 17 inclined downwardly towards the engagement slot 16. The catch member of the tape drive mechanism is brought into engagement with the opposed engagement slots 16 of the upper and lower engagement arms 13 and is operated so as to draw the tape 3 out of the cartridge casing 1. A mouth 18 is formed at a longitudinally inner end of the engagement slot 16.

Figure 8:
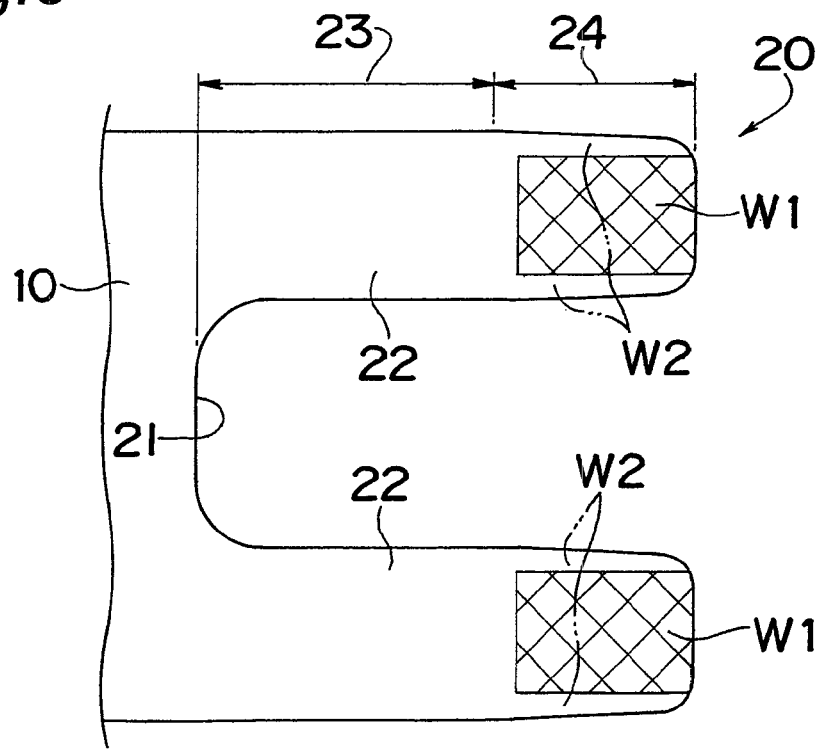
FIG. 8 is a front elevational view showing a developed state of the coupling portion of FIG. 1.

The leader tape 10 is formed by an elastic and hard plastic sheet made of, for example, polyethylene terephthalate or polybutylene terephthalate and a coupling portion 20 is formed at a leading edge of the leader tape 10. The coupling portion 20 is coupled with the pin 12 so as to be made integral with the leader member 11. The coupling portion 20 is constituted by a pair of winding pieces 22 which are spaced away from each other by an elongated cutout 21 formed at a central portion of an end of the leader tape 10. As shown in FIG. 1, a width H of the cutout 21 is so set as to be slightly larger than a length of the locking rod 12a of the pin 12. In FIG. 8 showing a developed state of the coupling portion 20, each of the winding pieces 22 is formed by a base portion 23 disposed at its base end portion and having a constant width and a tapered turnover portion 24 extending continuously from the base portion 23. Opposite corners of a distal end of the turnover portion 24 are rounded smoothly.

Figure 5:
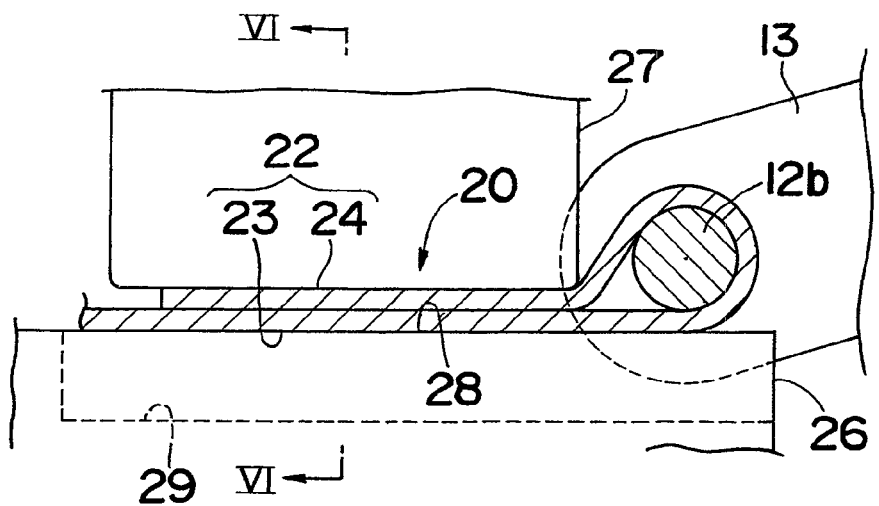
FIG. 5 is a vertically sectional side elevational view showing a welding state of the coupling portion of the leader tape of FIG. 1.

The leader tape 10 and the leader member 11 are coupled with each other as follows. As shown in FIGS. 1, 2 and 5, the turnover portion 24 is wound around each of the winding rods 12b of the pin 12 and turned over to the base portion 23. In a state where there is a slight play between the winding piece 22 and the winding rod 12b, the turnover portion 24 is attached to the base portion 23 by ultrasonic welding. At this time, the present invention is characterized in that ultrasonic welding of the turnover portion 24 is performed by using an improved anvil 26 and a welding horn 27.

Figure 6:
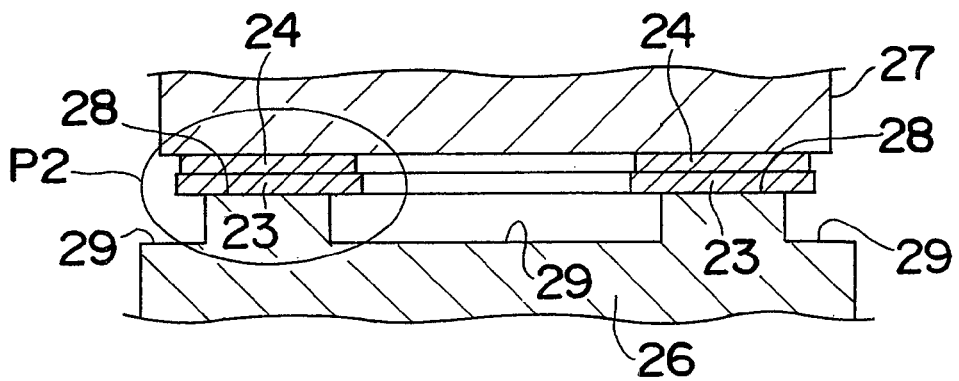
FIG. 6 is a sectional view taken along the line VI-VI in FIG. 5.
Figure 7:
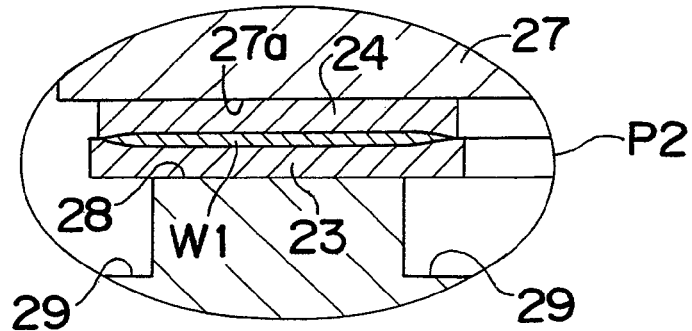
FIG. 7 is an enlarged view of a portion P2 in FIG. 6.

More specifically, as shown in FIGS. 6 and 7, a central portion and opposite side portions of one end of an upper face of the anvil 26 are removed as a central recess 29 and a pair of opposite side recesses 29, respectively such that a pair of rectangular anvil faces 28 each for supporting the base portion 23 are defined between the central recess 29 and one of the opposite side recess 29 and between the central recess 29 and the other of the opposite side recesses 29, respectively. As shown in FIGS. 1 and 2, a width B2 of the anvil face 28 is so set as to be smaller than a maximum width B1 of the turnover portion 24. In this embodiment, the width B2 of the anvil face 28 is set at 70% of the maximum width B1 of the turnover portion 24 but may range from 65% to 75% of the maximum width B1 of the turnover portion 24. After the leader member 11 has been positioned and held by a jig (not shown), the base portion 23 and the turnover portion 24 held in contact with each other are placed on the anvil face 28 and gripped between a press face 27a of the welding horn 27 and the anvil face 28 of the anvil 26. By performing ultrasonic vibrations of the welding horn 27 in this state, the turnover portion 24 and the base portion 23 are welded to each other.

In case ultrasonic welding is performed by using the anvil face 28 narrower than the turnover portion 24 as described above, a completely welded area W1 having a width equal to the width B2 of the anvil face 28 is formed from a center to a vicinity of opposite side edges of the turnover portion 24 as shown by coarse hatching in FIG. 2. On the other hand, in opposite side portions of a contact area between the turnover portion 24 and the base portion 23, which project out of opposite side edges of the anvil face 28, a pair of incompletely welded areas W2 having welding degree lower than that of the completely welded area W1 are formed as shown by fine hatching in FIG. 2 because frictional heat obtained by the welding horn 27 becomes smaller as a location on the turnover portion 24 becomes more distant from the anvil face 28. Thus, fused resin pushed out of the completely welded area W1 flows to the incompletely welded areas W2 so as to bond the turnover portion 24 to the base portion 23 also in the incompletely welded areas W2. As a result, material deterioration of the opposite side edges of the turnover portion 24 and the base portion 23 can be eliminated while the turnover portion 24 is securely welded to the base portion 23. Therefore, it is possible to positively prevent such a phenomenon that fracture of the leader tape 10 starts from the opposite side edges of the turnover portion 24 and the base portion 23 upon thermal welding of the winding pieces 22. It is also possible to prevent the fused resin from oozing out of the opposite side edges of the base portion 23.

In a state where the coupling portion 20 has been coupled with the pin 12, the lower edge of the upper winding piece 22 and the upper edge of the lower winding piece 22 are, respectively, positioned by the upper and lower step portions 14 of the locking rod 12a as shown in FIGS. 1 and 2 and thus, the coupling portion 20 of the leader tape 10 can be regulated from shifting upwardly or downwardly from a predetermined position. Meanwhile, since a slight gap is formed between the pin 12 and the winding pieces 22, the leader member 11 and the leader tape 10 are allowed to be rotated relative to each other.

In order to hold and fix the leader member 11 at a predetermined waiting attitude when the tape cartridge is not in use, a locking member 31 is disposed in the cartridge casing 1 so as to confront the tape window 4 and upper and lower arm supports 32 for supporting the upper and lower engagement arms 13 are provided adjacent to the locking member 19 in the upper and lower casings 1a and 1b, respectively as shown in FIG. 3. When the upper and lower engagement arms 13 are, respectively, supported by the upper and lower arm supports 32 and the locking rod 12a is gripped by the locking member 31, the leader member 11 can be held at a proper waiting attitude at all times. In addition, even if the tape 3 is slackened at this time, the previously positioned waiting attitude of the leader member 11 can be held against drop impact. Meanwhile, locking of the locking member 31 is released by inserting a pin from outside of the cartridge casing 1.

Second Embodiment

Figure 9:
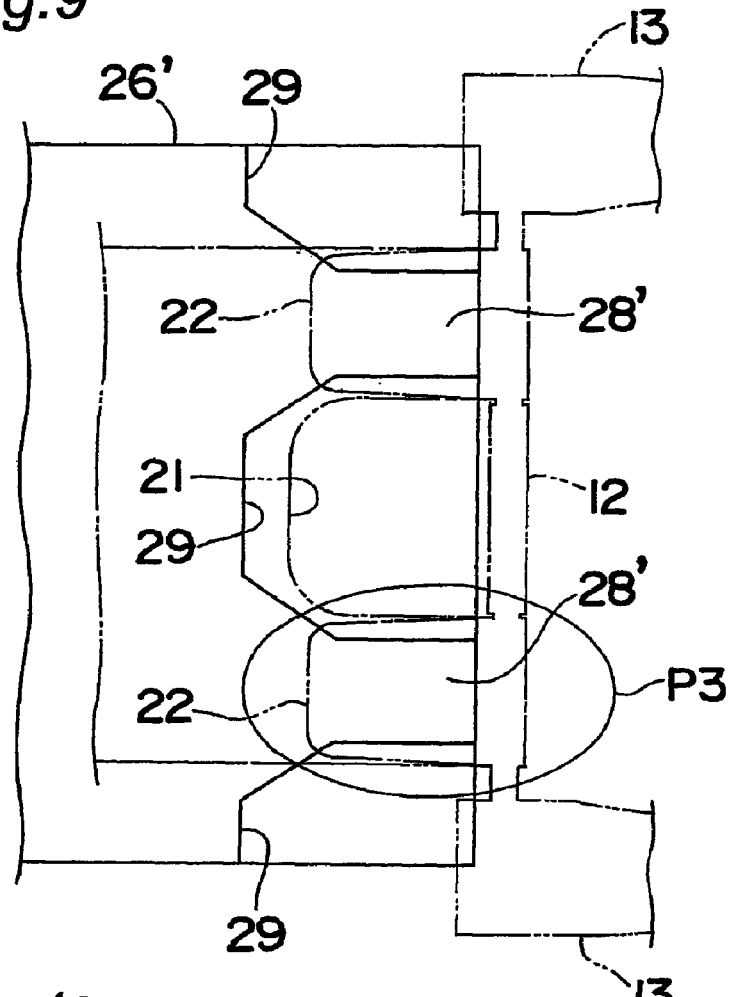
FIG. 9 is a top plan view showing an anvil employed in a single-reel type tape cartridge according to a second embodiment of the present invention.
Figure 10:
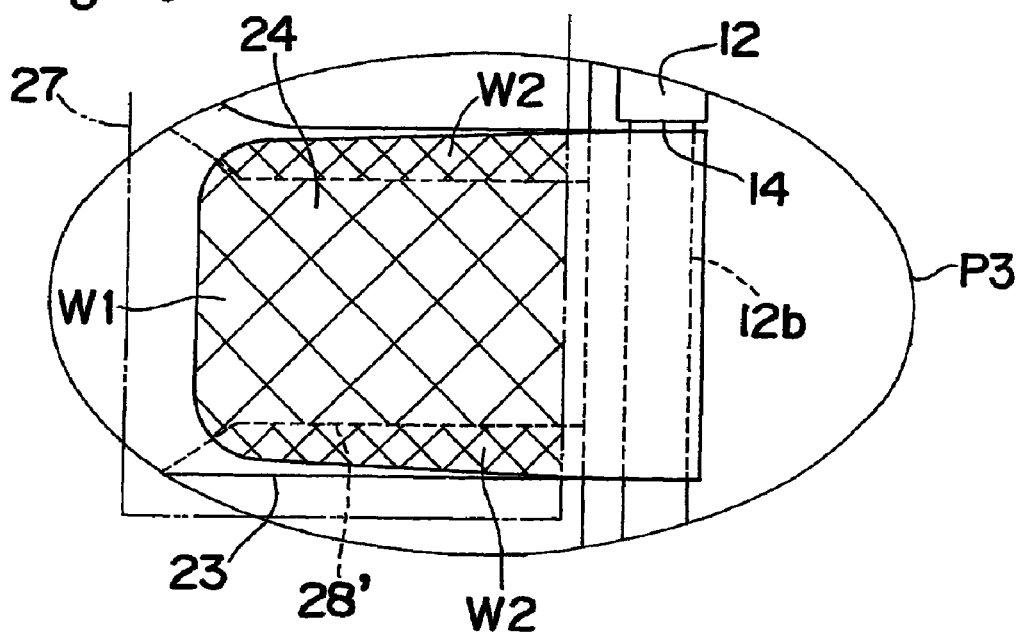
FIG. 10 is an enlarged view of a portion P3 in FIG. 9.

FIGS. 9 and 10 show a pair of anvil faces 28' of an anvil 26' employed in a single-reel type tape cartridge according to a second embodiment of the present invention. In the first embodiment, the anvil face 28 is formed into a rectangular shape as described above. However, in the second embodiment, a base portion of the anvil face 28' is expanded into a trapezoidal shape so as to increase a region of the completely welded area W1 at the distal end of the turnover portion 24. Since other constructions of this single-reel type tape cartridge of the second embodiment are similar to those of the single-reel type tape cartridge of the first embodiment, the description is abbreviated for the sake of brevity.

In the foregoing embodiments, the turnover portion 24 is tapered towards its distal end but is not required to be tapered towards its distal end. The turnover portion 24 may be at least formed gradually smaller towards its distal end. If necessary, an almost whole portion of the turnover portion 24 may be formed into a rectangular shape having a width slightly smaller than that of the base portion 23 such that the turnover portion 24 is made continuous with the base portion 23 smoothly. Furthermore, the anvil face 28 may be formed gradually smaller towards its base portion so as to make a smaller similar figure of the turnover portion 24 such that the incompletely welded areas W2 have a constant width.

Hereinafter, marked effects gained in the single-reel type tape cartridge of the present invention are described. Firstly, the completely welded area W1 having the width substantially equal to that of the anvil face 28 is formed in the turnover portion 24, while the incompletely welded area W2 is formed between each of the opposite side edges of the completely welded area W1 and each of the opposite side edges of the turnover portion 24. In the incompletely welded areas W2 projecting out of the opposite side edges of the anvil face 28, since sufficient frictional heat cannot be obtained, welding degree of a bonding face between the turnover portion 24 and the base portion 23 drops further as a location on the bonding face becomes more distant from the anvil face 28. Thus, the fused resin pushed out of the completely welded area W1 flows to the incompletely welded areas W2 so as to bond the turnover portion 24 to the base portion 23 also in the incompletely welded areas W2. As a result, since transfer of frictional heat to the opposite side edges of the turnover portion 24 and the base portion 23 is restricted while the turnover portion 24 is securely welded to the base portion 23, material deterioration of the opposite side edges of the turnover portion 24 and the base portion 23 can be restrained. Therefore, in the single-reel type tape cartridge of the present invention, since the turnover portion 24 can be securely attached to the base portion 23 at a high welding strength, not only reliability of a coupling section between the leader member 11 and the leader tape 10 can be upgraded but material deterioration of the opposite side edges of the turnover portion 24 and the base portion 23 upon thermal welding of the winding piece 22 can be restrained. Hence, fracture of the leader tape 10 from the opposite side edges of the base portion 23 and the turnover portion 24 can be prevented positively. Since the fused resin which has oozed out of the completely welded area W1 is received by the incompletely welded areas W2, it is also possible to prevent ooze of the fused resin out of the opposite side edges of the base portion 23.

Secondly, since the turnover portion 24 is formed gradually smaller towards its distal end such that the incompletely welded area W2 is formed gradually smaller towards its distal end along each of the opposite side edges of the turnover portion 24, a length of a welding section of the turnover portion 24 along the pin 12, on which welding section an external load is likely to be concentrated, namely, a sum of a length of a welding section of the completely welded area W1 along the pin 12 and a length of welding sections of the incompletely welded areas W2 along the pin 12 can be made large, so that reliability of the coupling section between the leader member 11 and the leader tape 10 can be further upgraded by increasing welding strength between the turnover portion 24 and the base portion 23.

Thirdly, since the width B2 of the completely welded area W1 is set at about 70% of the maximum width B1 of the turnover portion 24, a surplus width of about 15% of the maximum width B1 of the turnover portion 24 is left at each of opposite sides of the completely welded area W1 in the turnover portion 24. Hence, even if accuracy of positioning the base portion 23 relative to the anvil face 28 is low, ooze of the fused resin out of the opposite side edges of the base portion 23 can be prevented by securely welding the turnover portion 24 to the base portion 23. Therefore, in contrast with conventional welding in which a press face of a welding horn is required to be accurately positioned relative to the winding pieces, winding operation can be easily performed rapidly, thereby resulting in rise of production efficiency of the tape cartridge.

What is claimed is:

1. A method of manufacturing a single-reel type tape cartridge, the single-reel type tape cartridge comprising:
   a leader tape which includes coupling portion disposed at its leading edge; and
   a leader member which includes a pin;
   wherein the coupling portion is wound around the pin and turned over to the leader tape so as to be attached to the leader tape by ultrasonic welding using a welding horn for applying ultrasonic vibrations to the coupling portion supported by an anvil and includes a pair of winding pieces spaced away from each other by an elongated cutout formed at a central portion of an end of the leader tape;
   wherein each of the winding pieces includes a base portion disposed at its base end portion and a turnover portion wound around the pin and turned over to the base portion so as to be attached to the base portion by ultrasonic welding;
   wherein the anvil has a pair of anvil faces and ultrasonic welding of the turnover portion to the base portion is performed by pressing the welding horn against the turnover portion held in contact with the base portion supported on the anvil faces so as to form a completely welded area within opposite side edges of the turnover portion by setting a width of the completely welded area to that of each of the anvil faces and an incompletely welded area between each of opposite side edges of the completely welded area and each of the opposite side edges of the turnover portion;
   wherein a completely welded area having a width substantially equal to that of each of the anvil faces is formed from a center to a vicinity of opposite side edges of the turnover portion and an incompletely welded area is formed between each of opposite side edges of the completely welded area and each of the opposite side edges of the turnover portion,
   wherein the turnover portion is tapered such that the incompletely welded area is tapered along each of the opposite side edges of the turnover portion.

2. The method according to claim 1, wherein each of the anvil faces have a width equal to about 70% of a maximum width of the turnover portion.

3. The method according to claim 1, wherein a base portion of each of the anvil faces is expanded into a trapezoidal shape at the distal end of the turnover portion.

4. The method according to claim 2, wherein a base portion of each of the anvil faces is expanded into a trapezoidal shape at the distal end of the turnover portion.

* * * * *